United States Patent [19]

Freitag

[11] 4,080,921
[45] Mar. 28, 1978

[54] UNIVERSAL COUPLING SYSTEM

[75] Inventor: Werner F. J. Freitag, Driefontein, South Africa

[73] Assignee: SBT Development Corporation, Baltimore, Md.

[21] Appl. No.: 713,993

[22] Filed: Aug. 12, 1976

[30] Foreign Application Priority Data

Aug. 22, 1975 South Africa ...................... 75/5386

[51] Int. Cl.² ............................................. B63B 21/56
[52] U.S. Cl. .................................. 114/249; 280/492; 403/74
[58] Field of Search ............................... 114/247–252, 114/267, 77 R; 9/25; 403/69, 74, 186, 259, 261; 280/492; 188/313

[56] References Cited

U.S. PATENT DOCUMENTS

| 2,838,229 | 6/1958 | Belanger | 188/313 X |
|---|---|---|---|
| 2,867,452 | 1/1959 | Ricklick | 280/492 |
| 2,890,065 | 6/1959 | Shaffer | 280/492 |
| 3,461,829 | 8/1969 | Mosvold | 114/249 X |
| 3,742,892 | 7/1973 | Freitag | 114/249 |

FOREIGN PATENT DOCUMENTS 46,076  9/1960  Poland .................. 114/249

Primary Examiner—Trygve M. Blix
Assistant Examiner—Sherman D. Basinger
Attorney, Agent, or Firm—Cushman, Darby & Cushman

[57] ABSTRACT

An improved system for coupling together two objects, particularly sea-going vessels, while permitting relative and at least limited movement in at least three axes — roll, pitch and yaw — with a one or more vertical elements mounted on the stern of one towing vessel each coupled to a horizontal element mounted on the bow of a second towed vessel to permit formation of a sea-going barge train pulled by a tug. The horizontal element includes a fluid-tight housing which is mounted for limited lateral movement and which defines an internal chamber in which a piston member and an attached rod move. The rod extends outboard to connect to the vertical element and specifically to one of a pair of concentric vertical members, the other of which is fixedly mounted on the towing vessel. The vertical members move slidably in a vertical direction with respect to each other. The piston of the horizontal element divides the chamber into first and second sub-chambers which are coupled to pneumatic or hydraulic sources which supply fluid or gas to damp piston movement and/or aid in steering. A lateral damping member may be connected to each housing of the horizontal element, particularly when only two couplers are mounted on opposite sides of the vessels. A rigid center coupler flanked by the two piston couplers can be used on larger barges in place of the two side couplers, and also effectively minimizes lateral movement.

9 Claims, 8 Drawing Figures

UNIVERSAL COUPLING SYSTEM

The invention relates generally to an improved universal coupling device, and more particularly, to coupling devices for coupling sea-going barges or the like to a tug and to each other.

Barge trains have been used for many years to transport goods on inland waterways. Such trains, however, have not been successfully employed for ocean-going traffic where high seas and winds make rigid coupling of the barges impractical. Accordingly, some way to intercouple barges which permits relative and at least limited freedom of movement in the three axes of yaw, pitch and roll is required.

Universal joints as such are old in the art and include ball and socket joints and interconnected annular objects in which each intersects the annular space of the other. These devices have proven satisfactory for coupling small objects, but efforts to adapt these couplings for use with large objects of the magnitude of ocean-going vessels have not proven feasible economically or mechanically.

The invention's main utility at present is for closely coupling large marine vessels for towing purposes, and the invention will be hereinafter described in connection with this use. More particular, the invention can be used to couple barges to each other and to a tug to form an ocean-going barge train. It is an object of the invention to provide an improved coupling between two large masses of the magnitude of marine vessels that will space the vessels a fixed distance apart while permitting each relative and at least limited independent movement in the three axes of movement nautically referred to as axes of roll, pitch and yaw.

Applicant's previous publications and patents describe a coupling system which provides these desired freedoms of movement. In particular, such coupling system includes two elements mounted respectively on the bow and stern of the vessels to be coupled together. One element includes a housing mounted on the bow of one vessel for limited lateral movement and defining a fluid-tight internal chamber. A piston member is slidably and rotatably mounted in the chamber and is attached to a rod extending outboard from the chamber. The piston divides the chamber into two sub-chambers, the respective volumes of which vary as a function of the piston position. The second element includes a pair of intercoupled coaxial members slidably coupled to each other for relative vertical movement. One of the intercoupled vertical members is fixed to the stern of the other vessel, and the other member is locked to the outboard extending rod. Springs are provided in each of the respective sub-chambers for damping and controlling inboard and outboard movement of the rod.

The present invention relates to an improved system of this general type in which hydraulic or pneumatic fluid is supplied to the sub-chambers. One purpose of the fluid is to assist the springs in damping horizontal movement and a bypass valve may be used to permit gradual flow from one sub-chamber to the other. Alternatively, the sub-chambers may be connected to hydraulic or pneumatic pressure tanks for relieving pressure selectively to permit pivoting of the coupled vessels and thus aid in steering. In the illustrated embodiment, the fluid is pumped to the respective sub-chambers to move the piston and rod and positively steer the coupled vessels.

According to other improvements, a lateral damping device may also be provided for damping and limiting lateral movement of the piston housing, particularly when only two couplers on opposite sides are used. A center coupler including rubber or other bumpers flanked by the above-described couplers will also satisfactorily prevent lateral movement. The use of a center coupler finds particular utility in coupling large barges.

Reference is now made to the drawings in which.

Figure 1:
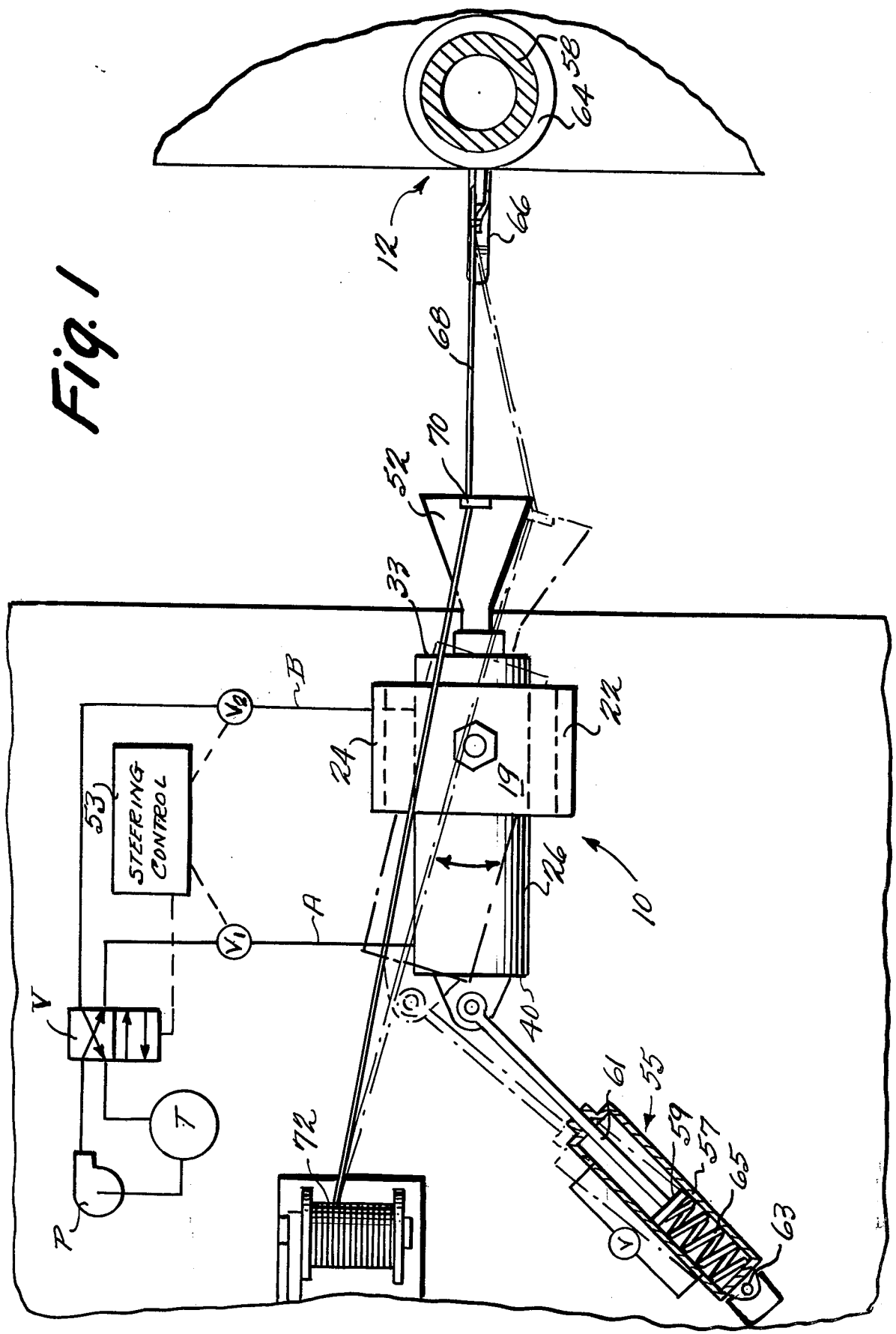
FIG. 1 is a plan view of the two improved coupling elements of the invention.
Figure 2:
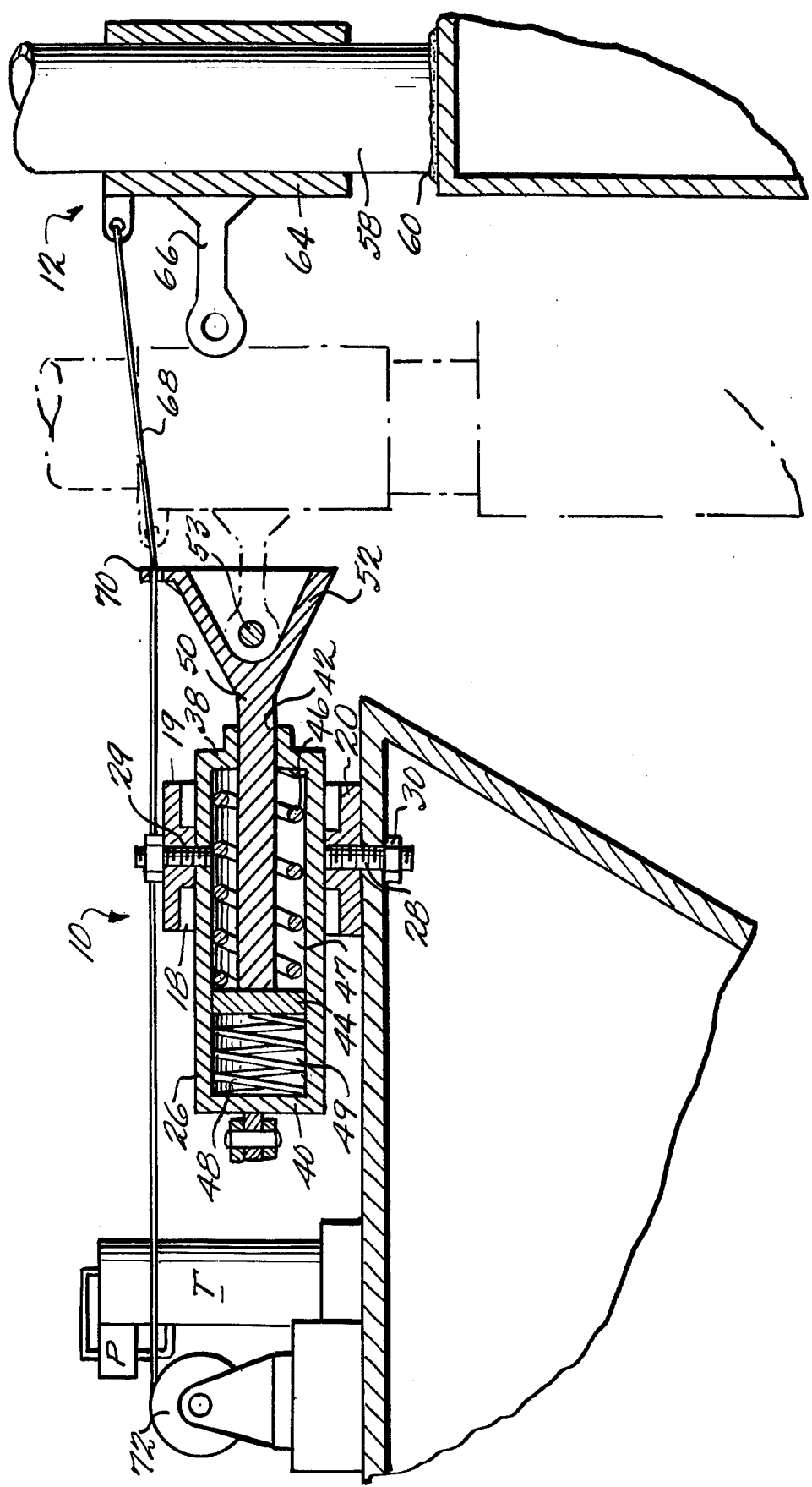
FIG. 2 is a cross-sectional view of the two coupling halves of the invention, along sectional lines 2—2 of FIG. 1.

Referring to FIGS. 1 and 2, the unique coupling device of this invention comprises two halves or elements — a horizontal element 10 and a vertical element 12. Complementary female and male portions of elements 10 and 12 respectively cooperate to lock together coupling elements 10 and 12 and thereby couple the respective vessels to which they are fixedly attached.

Horizontal coupling element 10 includes a fixed horizontal support 18 which is constructed of top plate 19, bottom plate 20 and side plates 22 and 24. These plates are welded or otherwise connected together. Support 18 is bolted by rod 28 and nut 30 to the bow of one of the towed vessels. Alternatively, housing 18 can be welded or otherwise attached to the bow. A cylindrical housing member 26 is pivotably mounted in support 18 about an axis defined by vertical rod 28 which passes through support 18 adjacent the outboard end thereof and by rod 29 which bolts plate 19 to housing 26. The outboard end of member 26 is partially closed by a depending circular flange 38, and the inboard end 40 is fully closed.

A tubular rod 42 is both slidably and rotatably mounted in a chamber within cylindrical member 26, and supported therein by a depending flange 38 of housing 26 with which member 26 forms a fluid-tight connection and an inboard piston 44 on tubular rod 42. A helical spring 46 is mounted in compression in the annular sub-chamber 47 defined between flange 38 and piston 44. A second spring 48 is mounted in compression in the cylindrical space 49 defined in housing 26 between piston 44 and closed end 40 of housing 26. Springs 46 and 48 oppositely bias rod 42 and piston 44 axially with the stronger spring 46 exceeding in ultimate compression force the maximum force to be exerted against it, plus the opposing force of spring 48. Thus, the compression force to which spring 46 is subjected should not ordinarily exceed its ultimate compressive strength.

The damping and controlling effects of springs 46 and 48 are supplemented in this improved coupler by pneumatic or hydraulic fluid in sub-chambers 47 and 49. A bypass valve may be provided to permit controlled flow of fluid between the chambers to damp movements.

Alternatively, as illustrated in FIGS. 1 and 2, the fluid may be pumped by a pump P to one of the sub-chambers via lines A and B and conventional switching valve V which is shifted by steering control 53 between (1) a position supplying fluid to sub-chamber 49 and permitting fluid to flow to tank T from sub-chamber 47 and thus cause rod 42 to move outboard and (2) a position supplying fluid to sub-chamber 47 and permitting fluid to flow to tank T from sub-chamber 29 and thus cause rod 42 to move inboard. Valves V and $V_2$ are closed by control 53 during normal straight line travel and opened during steering maneuvers.

Figure 5:
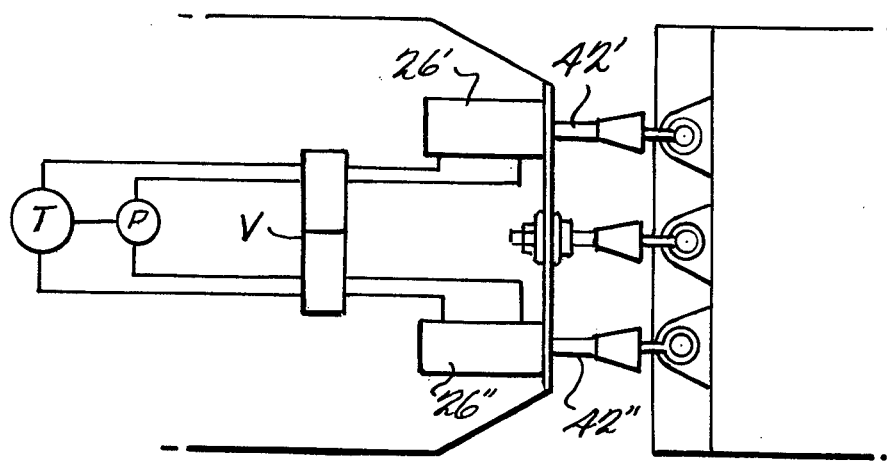
FIG. 5 shows a schematic view of the two intercoupled vessels of FIG. 4 in a steering maneuver.
Figure 4:
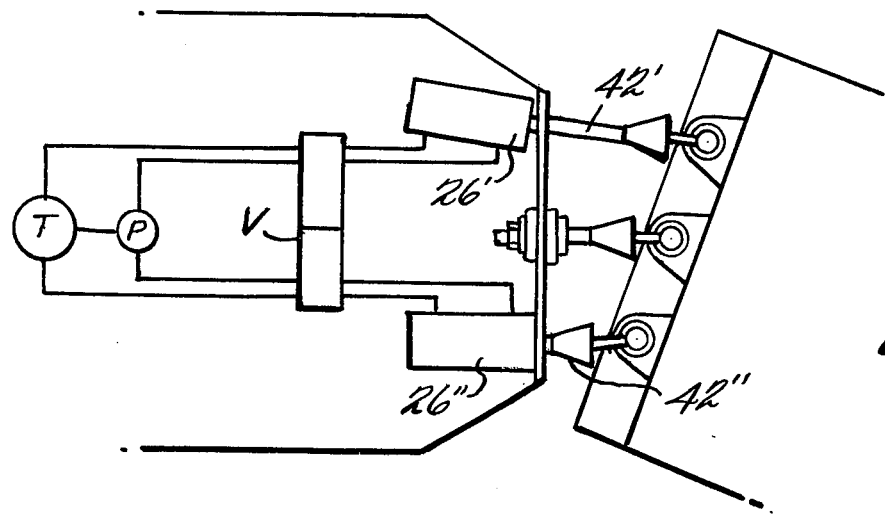
FIG. 4 shows a schematic view of two intercoupled vessels with a center coupler in normal alignment.

FIGS. 4 and 5 illustrate how this piston movement can aid steering. From the normal towing position in FIG. 4, the rod 42' of housing 26' in FIG. 5 has been pushed outboard and rod 42" of housing 26" pushed inboard to aid in turning to starboard around a pivoting center coupler as described below. Steam or any suitable hydraulic liquid or fluid can be used.

Attached to outboard end 50 of tubular member 42 which projects outwardly beyond the flanged end of housing 26 is a conically tapered guide member 52 with a spring loaded or hydraulically operated locking bolt 53. The vertical coupling element 12 includes a cylindrical vertical member 58 fixed at one end 60 and the opposite end (not shown) to an adjacent part of the second object or, more particularly, to the stern of a towing ship. A circular sleeve 64 is slidably and rotatably mounted on vertical member 58 and is adapted to slide up and down and turn thereon in the axes of roll and yaw. An eye member 66 is attached to sleeve 64 and is locked to guide member 52 by movement of bolt 53. A cable 68 is attached to sleeve 64 and passes through lead 70 to be wound about reel 72 which is mounted on the deck. Cable 68 is used to pull eye member 66 into guide member 52 where it can be locked in place.

From the above description, it is evident that two objects or two ships are held apart for a distance variable only by less than the length of rod 42 plus the length of projection of housing 26 beyond the ship edge, depending upon compression by towing or other stresses tending to separate the coupling of damping spring 46 and the hydraulic or pneumatic fluid. The horizontal element 10 of the coupling provides freedom of relative motion in the axes of roll and yaw, and in limited movement along the line of tow. The vertical element 12 provides freedom of relative motion in the axes of pitch and yaw. The elements in combination through the locking structure provide additional freedom of relative motion in the axis of pitch. Thus, the coupling provides double means for freedom of relative motion in the axes of pitch and yaw and single means in the axis of roll.

Figure 3:
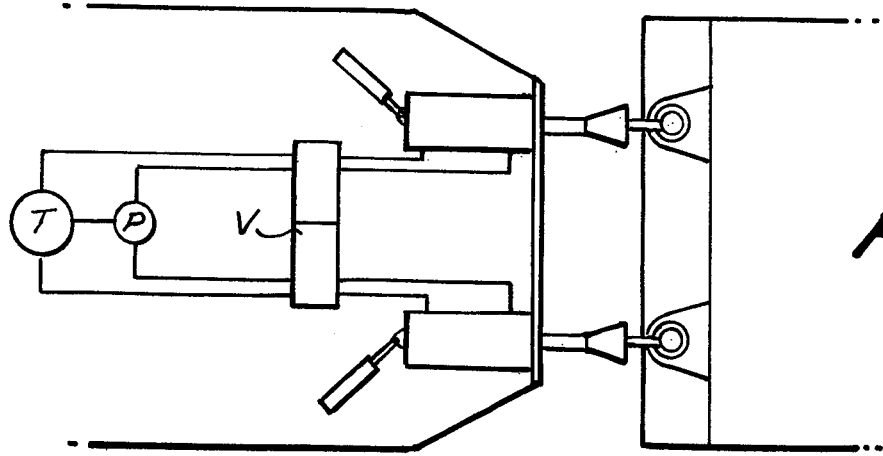
FIG. 3 shows a schematic view of two interconnected barges with two couplers as in FIGS. 1 and 2.

Lateral movement between towing and towed vessels occurs primarily because of wave action and must be minimized. This can be accomplished by utilizing a rigid center coupler as described below flanked by two couplers as illustrated in FIGS. 1 and 2 or by the use of a lateral damping member which is necessary when two couplers as in FIGS. 1 and 2 are mounted on either side of the vessels. FIG. 3 shows a schematic depiction of two intercoupled vessels with two couplers each equipped with a lateral damping member.

Lateral damping member 55 includes a housing 57 in which a piston 59 connected to a rod 61 is disposed for movement. Rod 61 is pivotably attached to the inboard end 40 of housing 26 and housing 57 is pivotably attached at end 63 to the deck. A bypass valve permits controlled flow between the sub-chambers defined by housing 57 and piston 55 and accordingly controlled lateral movement of housing 26. A spring 65 is provided between piston 59 and end 63 to ensure that the couplers return to the normal in-line position after a turn. Damping member 55 permits necessary lateral movement during turning, but the damping effect it provides eliminates almost all lateral movement which would otherwise result from wave action.

Figure 6:
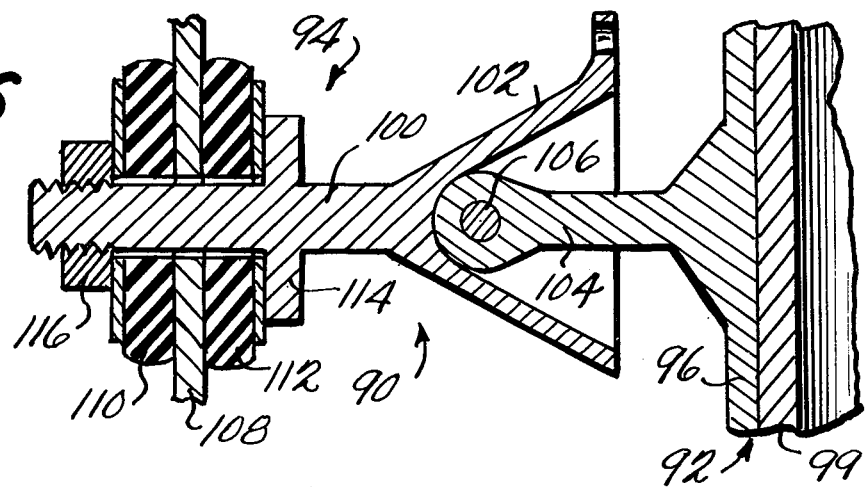
FIG. 6 shows a side view of a center coupler.
Figure 7:
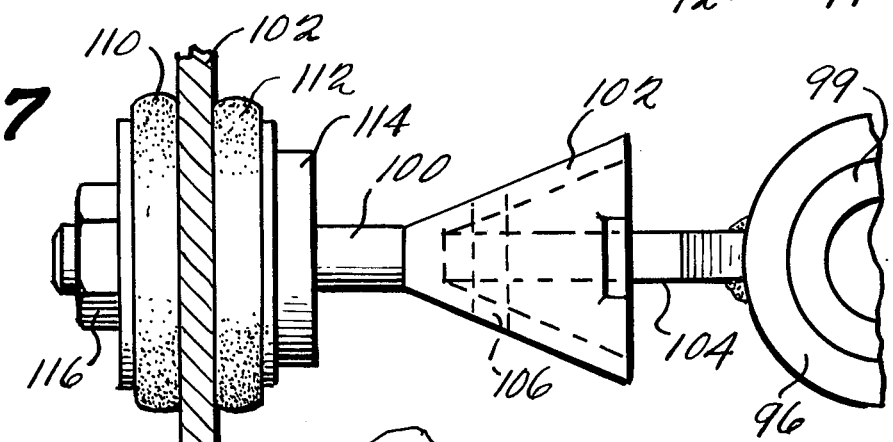
FIG. 7 shows a top view of the center coupler of FIG. 6.

As indicated above, the problem of lateral damping can also be overcome by using a rigid center coupler, such as shown in FIGS. 6 and 7 flanked by the couplers of FIGS. 1 and 2. This arrangement is shown generally in FIGS. 4 and 5.

Coupler 90 includes elements 92 and 94. Element 92 comprising a pair of concentric cylindrical members or sleeves 96 and 99 which can be moved vertically with respect to each other in the same fashion described above. Member 94, however, permits only very limited inboard and outboard movement. Rod 100 terminates at one end in a conical guide member 102 which receives an eye member 104 which is fixed to sleeve 96. Eye member 104 is locked in position with a bolt 106 operated by a conventional semi-automatic or automatic locking device as described above. Rod 100 passes through a bore in the bulkhead 108 in the bow of the towed vessel. Rubber bumpers 110 and 112 which may be covered by suitable protective steel plates are arranged on either side of bulkhead 108 and held in place by an enlarged shaft portion 114 and nut 116 which is threaded by rod 100. Any arrangement for permitting limited movement, such as springs, hydraulic cylinders or the like, can be used in place of the rubber bumpers. Bumper 110 and 112 allow only limited lateral and inboard/outboard movement. The flanking couplers of FIGS. 1 and 2, however, permit sufficient movement to effect turning and allow sufficient freedom of movement to provide satisfactory coupling even in high seas.

Figure 8:
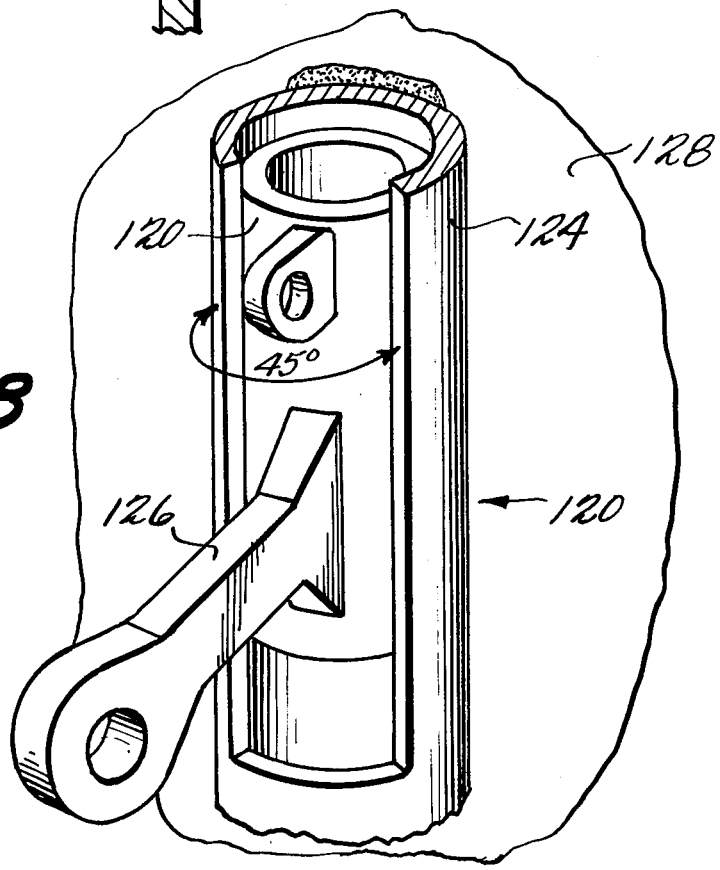
FIG. 8 shows a perspective view of an alternative vertical element, particularly useful in coupling large barges.

FIG. 8 shows a vertical element 120 in which tubular member 122 is disposed for vertical sliding movement within sleeve 124. An eye member 126 is attached to member 122 and extends outward in a slot of sleeve 124 which permits limited movement about a vertical axis. The arrangement of FIG. 8 finds particular utility in intercoupling large vessels since sleeve 124 can be welded to bulkhead 128 along its entire length.

Many changes and modifications in the above-described embodiment of the invention can, of course, be carried out without departing from the scope of the invention. While the invention finds particular application in coupling sea-going barges, it can also be used for coupling land vehicles moving over rough or icy surfaces, etc. The scope of the invention accordingly is limited only by the scope of the appended claims.

What is claimed is:

1. A coupling system for interconnecting first and second objects so as to permit at least limited freedom of movement in three axes — pitch, yaw and roll — comprising:
   a first element including a housing enclosing a fluid-tight inner chamber, a rod member movable in said housing in a generally horizontal direction and having an outboard end extending out of said housing, a piston attached to the inboard end of said rod and separating said chamber into first and second sub-chambers having respective volumes which vary as a function of the position of said piston and means for mounting said housing to one of said objects to permit limited lateral movement of said housing;

a second element including a pair of concentric tubular members movable with respect to each other in a vertical direction, means for connecting one of said tubular members to the other of said objects and means for connecting the other of said tubular means to said outboard end;

means coupled to said sub-chambers for supplying a fluid thereto; and means connecting the end of said housing remote from the outboard end of said piston to said one object for damping lateral movement of said housing including a damping housing defining a piston chamber, a piston mounted for movement in said piston chamber and dividing said piston chamber into first and second piston sub-chambers, means for permitting controlled movement of fluid between said piston sub-chambers, a spring in one of said piston chambers for returning said damping piston to an initial position and means for pivotably connecting said damping piston to said housing of said first element.

2. A coupling system as in claim 1 wherein said fluid is a hydraulic fluid and including a source thereof.

3. A coupling system as in claim 1 wherein said fluid is a pneumatic fluid and including a source thereof.

4. A system as in claim 1, wherein said damping means includes a bypass valve connected between said piston sub-chambers for permitting controlled movement of fluid between said piston sub-chambers.

5. A system as in claim 1 further including means connected to said supplying means for controlling supply of said fluid in accordance with desired steering of said vessels.

6. A system as in claim 5 wherein said controlling means includes a pump, fluid tank, first and second fluid lines each connected to one of said sub-chambers and a switching valve connecting in a first position one of said lines to said tank and the other of said lines to said pump and in a second position said other line to said tank and said one line to said pump.

7. A coupling system for interconnecting first and second objects so as to permit at least limited freedom of movement in three axes — pitch, yaw and roll — comprising:

a pair of first coupling devices, each having a first element including a housing enclosing a fluid-tight inner chamber, a rod member movable in said housing in a generally horizontal direction and having an outboard end extending out of said housing, a piston attached to the inboard end of said rod and separating said chamber into first and second sub-chambers having respective volumes which vary as a function of the position of said piston and means for mounting said housing to one of said objects to permit limited lateral movement of said housing, a second element including a pair of concentric tubular members movable with respect to each other in a vertical direction, means for connecting one of said tubular members to the other of said objects and means for connecting the other of said tubular members to said outboard end, and means coupled to said sub-chambers for supplying a fluid thereto; and a second coupling device mounted between said pair of said first coupling devices, said second device comprising a pair of second concentric tubular members movable with respect to each other in a vertical direction, a connecting member pivotably connected to one of said second tubular members at one end and extending through a bore in a bulkhead, first and second bumper means mounted about said connecting member on either side of said bulkhead and means for holding said bumper means against said bulkhead.

8. A system as in claim 1 wherein said objects are sea-going vessels and including said vessels.

9. A coupling system for interconnecting first and second objects so as to permit at least limited freedom of movement in three axes — pitch, yaw and roll — comprising:

a first element including a housing enclosing a fluid-tight inner chamber, a rod member movable in said housing in a generally horizontal direction and having an outboard end extending out of said housing, a piston attached to the inboard end of said rod and separating said chamber into first and second sub-chambers having respective volumes which vary as a function of the position of said piston and means for mounting said housing to one of said objects to permit limited lateral movement of said housing;

a second element including a pair of concentric tubular members movable with respect to each other in a vertical direction, one of said tubular members including an outer sleeve member having a vertically extending slot and the other of said tubular members including an inner sleeve slidably mounted within said outer sleeve, means for connecting said one tubular member to the other of said objects and means for connecting said other of said tubular members to said outboard end including a member fixed to said inner sleeve at one end and having at the other end an eye for attachment to said outboard end; and means coupled to said sub-chambers for supplying a fluid thereto.

* * * * *